US012716007B2

(12) United States Patent
Kang

(10) Patent No.: US 12,716,007 B2
(45) Date of Patent: Aug. 25, 2026

(54) METHOD FOR MAKING CANVAS

(71) Applicant: ZHEJIANG LIFESHINE ARTS CO., LTD, Yiwu City (CN)

(72) Inventor: Xiuhua Kang, Yiwu City (CN)

(73) Assignee: ZHEJIANG LIFESHINE ARTS CO., LTD, Yiwu City (CN)

( * ) Notice: Subject to any disclaimer, the term of this patent is extended or adjusted under 35 U.S.C. 154(b) by 54 days.

(21) Appl. No.: 18/778,826

(22) Filed: Jul. 19, 2024

(65) Prior Publication Data

US 2024/0376335 A1 Nov. 14, 2024

(51) Int. Cl.

| | |
|---|---|
| ***C09D 131/04*** | (2006.01) |
| ***D06M 11/44*** | (2006.01) |
| ***D06M 11/46*** | (2006.01) |
| ***D06M 11/76*** | (2006.01) |
| ***D06M 11/79*** | (2006.01) |
| ***D06M 15/263*** | (2006.01) |
| ***D06M 15/333*** | (2006.01) |
| ***D06M 15/643*** | (2006.01) |
| ***D06N 3/00*** | (2006.01) |
| ***D06N 3/04*** | (2006.01) |
| ***D06N 3/12*** | (2006.01) |
| ***D06N 3/18*** | (2006.01) |
| *D06M 101/32* | (2006.01) |

(52) U.S. Cl.

CPC ........... *C09D 131/04* (2013.01); *D06M 11/44* (2013.01); *D06M 11/46* (2013.01); *D06M 11/76* (2013.01); *D06M 11/79* (2013.01); *D06M 15/263* (2013.01); *D06M 15/333* (2013.01); *D06M 15/643* (2013.01); *D06N 3/0036* (2013.01); *D06N 3/0063* (2013.01); *D06N 3/045* (2013.01); *D06N 3/128* (2013.01); *D06N 3/183* (2013.01); *D06M 2101/32* (2013.01); *D06M 2200/40* (2013.01); *D06N 2209/1657* (2013.01); *D06N 2211/00* (2013.01)

(58) Field of Classification Search

CPC ..... C09D 131/04; D06M 11/44; D06M 11/46; D06M 11/76; D06M 11/79; D06M 15/263; D06M 15/233; D06M 15/643; D06M 2101/32; D06M 2200/40; D06N 3/0036; D06N 3/045; D06N 3/128; D06N 3/183; D06N 2209/1657; D06N 2211/00

See application file for complete search history.

(56) References Cited

U.S. PATENT DOCUMENTS

| | | | |
|---|---|---|---|
| 2006/0121320 | A1 | 6/2006 | Allen |
| 2010/0260961 | A1 | 10/2010 | Russo |
| 2021/0394550 | A1 | 12/2021 | Wang et al. |

FOREIGN PATENT DOCUMENTS

| | | | |
|---|---|---|---|
| CN | 113564939 A | * 10/2021 | ........... D06N 3/0088 |

* cited by examiner

*Primary Examiner* — Robert S Walters, Jr.

(57) ABSTRACT

The present invention discloses a method for making Xuan flannelette, which includes the following steps: firstly, drying and setting polyester fiber-chemical fiber gray fabric; secondly, coating the set gray fabric with a first sizing and drying the gray fabric, and finally, coating the dried gray fabric with a second sizing and drying the gray fabric. By designing a double-layer coating on the polyester fiber-chemical fiber gray fabric, the present invention makes the Xuan flannelette made according to the present invention suitable for diamond painting, and the yield is improved and the cost is reduced.

6 Claims, 1 Drawing Sheet

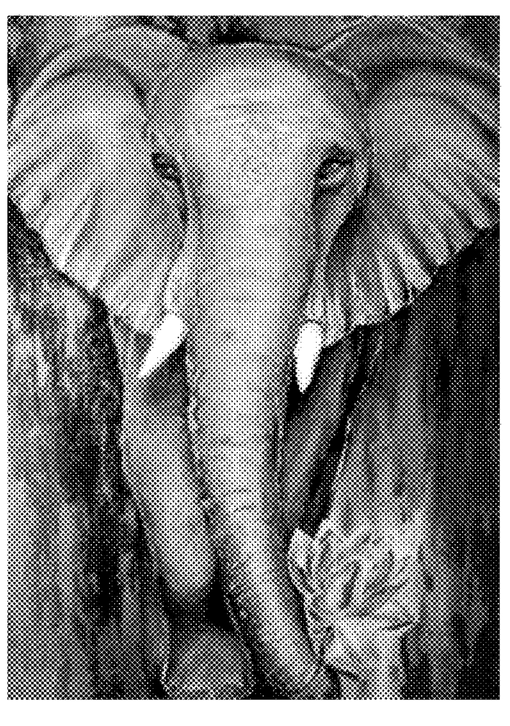

METHOD FOR MAKING CANVAS

TECHNICAL FIELD

The present invention pertains to the technical field of canvas, and specifically pertains to a method for making a canvas.

BACKGROUND

A diamond painting is made by printing background patterns on a canvas, applying a coating to the canvas and drying the canvas, manually pasting a flat bottom surface of artificial crystal diamonds on the number of the background pattern corresponding to the diamond, and finally splicing and pasting the background patterns. However, the canvas used in existing diamond paintings, has the following defects: the background pattern cannot be printed directly, and the patterns are usually printed by transfer printing, such as printing a color pattern on white paper, and then transferring the color pattern from the white paper to the canvas by a series of processes and reactions. There will be more scrapping due to skewness in the process, resulting in low yield and increased cost. In addition, the pattern transfer printing also has the defects of light pattern color, dark color and time-consuming process.

In addition, diamond surfaces have a certain weight, and after long-term storage, diamond paintings on the market still have defects such as large deformation of the base fabric, which affects the appearance and needs to be improved.

SUMMARY

In order to solve at least one of the above technical defects, the present invention provides the following technical solution:

The present application document discloses a method for making a canvas, which includes the following steps:

step 1, drying and setting a gray fabric;

step 2, coating the set gray fabric with a first sizing which has the following components by mass: 8-12 parts of styrene-acrylate emulsion, 30-50 parts of polyvinyl acetate emulsion, 4-6 parts of polysiloxane, 10-16 parts of calcium carbonate, 1-3 parts of silicon dioxide, 1-3 parts of magnesium oxide and 0.3-0.7 part of titanium dioxide, and drying the gray fabric; and step 3, coating the dried gray fabric with a second sizing which has the following components by mass: 50-65 parts of acrylic emulsion, 10-15 parts of polyvinyl acetate emulsion, 0.08-0.2 parts of a thickening agent, 0.3-0.8 part of a crosslinking agent and 0.5-1.2 parts of a co-crosslinking agent, and drying the gray fabric.

Further, the calcium carbonate and the titanium dioxide are coupling modified.

Further, the thickening agent is polyvinyl alcohol, the crosslinking agent is one or more of 2,5-dimethyl-2,5-di (tert-butylperoxy) hexane and 2,5-dimethyl-2,5-di(benzoylperoxy)hexane, and the co-crosslinking agent is one or more of trimethylolpropane triallyl ester, trimethylolpropane trimethacrylate, ethylene glycol diacrylate and diethylene glycol dimethacrylate.

Further, a drying temperature in step 2 is 80-170° C., and a drying temperature in step 3 is 70-130° C.

Further, a first coating layer in step 2 is $\frac{1}{8}$-$\frac{1}{10}$ of a weight of the gray fabric, and a second coating layer in step 3 is $\frac{1}{20}$-$\frac{1}{10}$ of the weight of the gray fabric.

Compared with the prior art, the present invention has the following beneficial effects:

By designing a double-layer coating on the a gray fabric, the canvas prepared according to the present invention is suitable for diamond painting compared with commercially available cloth, and has the advantages of being safe and environmentally friendly, and being resistant to light exposure, scratch, color fading, high temperature, diamond fall-off, shrinkage and deformation, and the most important point is there is no need to perform transfer printing for setting, which improves the yield, relatively reduces and enhances the market competitiveness.

BRIEF DESCRIPTION OF THE DRAWINGS

In order to illustrate the technical solution of the embodiments of the present invention more clearly, the accompanying drawings required for the description of the embodiments will be briefly introduced below. Apparently, the accompanying drawings in the following description are merely some rather than all embodiments of the present invention, and a person of ordinary skill in the art may still derive other drawings from these accompanying drawings without creative efforts.

FIG. 1 is a prior art diamond painting.

DESCRIPTION OF THE EMBODIMENTS

The present invention will be further described below in conjunction with specific embodiments.

In the following embodiments, styrene-acrylate emulsion was type 816; polyvinyl acetate emulsion was type SD-40; silicone oil was used as polysiloxane; calcium carbonate and titanium dioxide were modified by a coupling agent, for example, 550 coupling agent solution was sprayed for modification to improve dispersibility; pure acrylic emulsion was used as acrylic emulsion; 2,5-dimethyl-2,5-di(tert-butylperoxy) hexane was used as a crosslinking agent; ethylene glycol diacrylate was used as a co-crosslinking agent; and polyvinyl alcohol was used as a thickening agent.

Embodiment 1

A method for making canvas, included the following steps:

First step, a gray fabric was dried and set.

Second step, the gray fabric set in the first step was coated with a first sizing and dried, and the sizing was scraped by a scraper, the first sizing had the following components by mass: 8 parts of styrene-acrylate emulsion, 30 parts of polyvinyl acetate emulsion, 4 parts of polysiloxane, 10 parts of calcium carbonate, 1 part of silicon dioxide, 1 part of magnesium oxide and 0.3 part of titanium dioxide, and the components were added to a stirring mechanism successively to stir uniformly to form the first sizing; and the coating layer was dried at 110° C., and a weight of the coating layer accounted for $\frac{1}{8}$ of a weight of the gray fabric.

Third step, the gray fabric dried in the second step was coated with a second sizing and dried, the second sizing had the following components by mass: 50 parts of acrylic emulsion, 10 parts of polyvinyl acetate emulsion, 0.08 part of a thickening agent, 0.3 part of a crosslinking agent and 0.5 part of a co-crosslinking agent; and the coating layer was dried at 100° C., and a weight of the coating layer accounted for $\frac{1}{15}$ of a weight of the gray fabric.

Embodiment 2

A method for making canvas, included the following steps:

First step, a gray fabric was dried and set.

Second step, the gray fabric set in the first step was coated with a first sizing and dried, and the sizing was scraped by a scraper, the first sizing had the following components by mass: 9.5 parts of styrene-acrylate emulsion, 42 parts of polyvinyl acetate emulsion, 5 parts of polysiloxane, 12 parts of calcium carbonate, 1.2 parts of silicon dioxide, 2.2 parts of magnesium oxide and 0.4 part of titanium dioxide, and the components were added to a stirring mechanism successively to stir uniformly to form the first sizing; and the coating layer was dried at 130° C., and a weight of the coating layer accounted for 1/10 of a weight of the gray fabric.

Third step, the gray fabric dried in the second step was coated with a second sizing and dried, the second sizing had the following components by mass: 55 parts of acrylic emulsion, 12 parts of polyvinyl acetate emulsion, 0.1 part of a thickening agent, 0.4 part of a crosslinking agent and 0.6 part of a co-crosslinking agent; and the coating layer was dried at 100° C., and a weight of the coating layer accounted for 1/10 of a weight of the gray fabric.

Embodiment 3

A method for making canvas, included the following steps:

First step, a gray fabric was dried and set.

Second step, the gray fabric set in the first step was coated with a first sizing and dried, and the sizing was scraped by a scraper, the first sizing had the following components by mass: 10 parts of styrene-acrylate emulsion, 44 parts of polyvinyl acetate emulsion, 5.5 parts of polysiloxane, 13 parts of calcium carbonate, 2 parts of silicon dioxide, 2.3 parts of magnesium oxide and 0.5 part of titanium dioxide, and the components were added to a stirring mechanism successively to stir uniformly to form the first sizing; and the coating layer was dried at 110° C., and a weight of the coating layer accounted for 1/9 of a weight of the gray fabric.

Third step, the gray fabric dried in the second step was coated with a second sizing and dried, the second sizing had the following components by mass: 58 parts of acrylic emulsion, 13 parts of polyvinyl acetate emulsion, 0.1 part of a thickening agent, 0.5 part of a crosslinking agent and 0.8 part of a co-crosslinking agent; and the coating layer was dried at 90° C., and a weight of the coating layer accounted for 1/12 of a weight of the gray fabric.

Embodiment 4

A method for making canvas, included the following steps:

First step, a gray fabric was dried and set.

Second step, the gray fabric set in the first step was coated with a first sizing and dried, and the sizing was scraped by a scraper, the first sizing had the following components by mass: 12 parts of styrene-acrylate emulsion, 50 parts of polyvinyl acetate emulsion, 6 parts of polysiloxane, 15 parts of calcium carbonate, 3 parts of silicon dioxide, 2.6 parts of magnesium oxide and 0.6 part of titanium dioxide, and the components were added to a stirring mechanism successively to stir uniformly to form the first sizing; and the coating layer was dried at 110° C., and a weight of the coating layer accounted for 1/10 of a weight of the gray fabric.

Third step, the gray fabric dried in the second step was coated with a second sizing and dried, the second sizing had the following components by mass: 63 parts of acrylic emulsion, 13 parts of polyvinyl acetate emulsion, 0.1 part of a thickening agent, 0.7 part of a crosslinking agent and 1.1 part of a co-crosslinking agent; and the coating layer was dried at 120° C., and a weight of the coating layer accounted for 1/13 of a weight of the gray fabric.

Comparative Example 1

Compared to Embodiment 1, there was only a coating of the second sizing in this comparative example.

The prepared canvas was subjected to diamond painting preparation, where background patterns were directly jet printed without thermal transfer printing process, and the prepared diamond painting was detected to have the following properties:

Under the same conditions and standing for the same time, compared with Comparative Example 1, diamond paintings on the canvas prepared according to Embodiments 1~4 had substantially no deformation, and the diamond painting on the canvas prepared according to Comparative Example 1 had significant deformation.

Compared with Comparative Example 1, diamonds on the diamond paintings on the canvas prepared according to Embodiments 1-4 had fallen off by 2-3%, diamonds on the diamond paintings on the canvas prepared according to Embodiments 2 and 3 had substantially no fall-off (less than 1%), and diamonds on the diamond painting on the canvas prepared according to Comparative Example 1 had fallen off by about 15%.

Compared with Comparative Example 1, the diamond paintings on the canvas prepared according to Embodiments 1-4 had dark and bright colors, and clear patterns, but the diamond painting on the canvas prepared according to Comparative Example 1 had light and less bright color (visible to the naked eye), and blurry patterns.

In addition, the diamond paintings on the canvas prepared according to Embodiments 1-4 had the advantages of being resistant to high temperature, moisture and freezing, and the like.

What is claimed is:

1. A method for making a canvas, comprising the following steps:

step 1, drying and setting a gray fabric;

step 2, coating the gray fabric set in step 1 with a first sizing which has the following components by mass: 8-12 parts of styrene-acrylate emulsion, 30-50 parts of polyvinyl acetate emulsion, 4-6 parts of polysiloxane, 10-16 parts of calcium carbonate, 1-3 parts of silicon dioxide, 1-3 parts of magnesium oxide and 0.3-0.7 part of titanium dioxide, and drying the gray fabric at 80-170° C.; and step 3, coating the gray fabric dried in step 2 with a second sizing which has the following components by mass: 50-65 parts of acrylic emulsion, 10-15 parts of polyvinyl acetate emulsion, 0.08-0.2 parts of a thickening agent, 0.3-0.8 part of a crosslinking agent and 0.5-1.2 parts of a co-crosslinking agent, and drying the gray fabric;

wherein in step 2 a first coating layer is 1/8-1/10 of a weight of the gray fabric; and in step 3, a drying temperature is 70-130° C., and a second coating layer is 1/20-1/10 of the weight of the gray fabric.

2. The method according to claim 1, wherein in step 2, the first sizing has the following components: 9-10 parts of styrene-acrylate emulsion, 40-45 parts of polyvinyl acetate emulsion, 5-6 parts of polysiloxane, 12-14 parts of calcium carbonate, 1-2 parts of silicon dioxide, 2-2.5 parts of magnesium oxide, and 0.4-0.5 parts of titanium dioxide.

3. The method according to claim 2, wherein in step 2, the first sizing has the following components: 10 parts of styrene-acrylate emulsion, 44 parts of polyvinyl acetate emulsion, 5.5 parts of polysiloxane, 13 parts of calcium carbonate, 2 parts of silicon dioxide, 2.3 parts of magnesium oxide, and 0.5 parts of titanium dioxide.

4. The method according to claim 1, wherein in step 3, the second sizing has the following components: 58 parts of acrylic emulsion, 13 parts of polyvinyl acetate emulsion, 0.1 part of a thickening agent, 0.5 part of a crosslinking agent and 0.8 part of a co-crosslinking agent.

5. The method according to claim 1, wherein the calcium carbonate and the titanium dioxide are modified with a coupling agent.

6. The method according to claim 1, wherein the thickening agent is polyvinyl alcohol, the crosslinking agent is one or more of 2,5-dimethyl-2,5-di(tert-butylperoxy) hexane and 2,5-dimethyl-2,5-di(benzoylperoxy)hexane, and the co-crosslinking agent is one or more of trimethylolpropane triallyl ester, trimethylolpropane trimethacrylate, ethylene glycol diacrylate and diethylene glycol dimethacrylate.

* * * * *